United States Patent [19]
Draves

[11] Patent Number: 5,748,252
[45] Date of Patent: May 5, 1998

[54] METHOD AND APPARATUS FOR SYNCHRONIZING INTERNAL AND EXTERNAL VIDEO SIGNALS

[75] Inventor: Kenneth George Draves, Russiaville, Ind.

[73] Assignee: Delco Electronics Corporation, Kokomo, Ind.

[21] Appl. No.: 603,108

[22] Filed: Feb. 20, 1996

[51] Int. Cl.$^6$ ................................................. H04N 9/475
[52] U.S. Cl. ................................................. 348/516; 348/536
[58] Field of Search ........................ 348/516, 513, 348/512, 514, 517, 511, 510, 501, 500, 521, 522, 536, 539, 540, 541–549, 537, 538; 358/149; 375/373, 374, 375, 376; H04N 9/475

[56] References Cited

U.S. PATENT DOCUMENTS

| | | | |
|---|---|---|---|
| 3,619,803 | 11/1971 | Klein | 331/8 |
| 4,038,683 | 7/1977 | Thorpe et al. | 348/506 |
| 4,498,103 | 2/1985 | Aschwanden | 358/148 |

OTHER PUBLICATIONS

Elantec, Inc. brochure, EL4584C Genlock, 1993.

*Primary Examiner*—Christopher C. Grant
*Attorney, Agent, or Firm*—Jimmy L. Funke

[57] ABSTRACT

An automotive video display of a scene from a camera has a graphics window to display vehicle information. A video graphics controller has a programmable synchronous generator for the graphics window which is synchronized or gen-locked with the camera or external video signal. A digital sync separator provides digital external sync signals. A start circuit monitors the external sync signals to detect the start of a video frame and starts the sync generator which is initially in synchronism with the external signal. A phase locked loop maintains the synchronism. A crystal oscillator circuit includes an inductor and a varactor which is tuned to vary the oscillator frequency enough to track the external video signal.

9 Claims, 3 Drawing Sheets

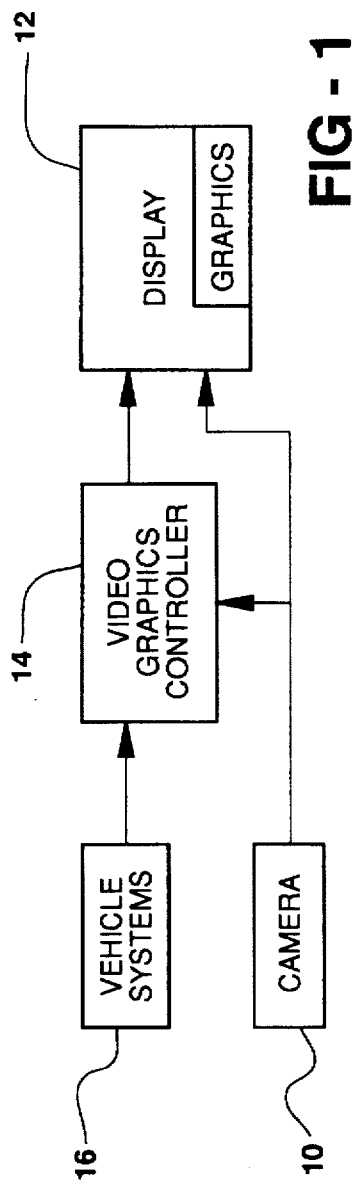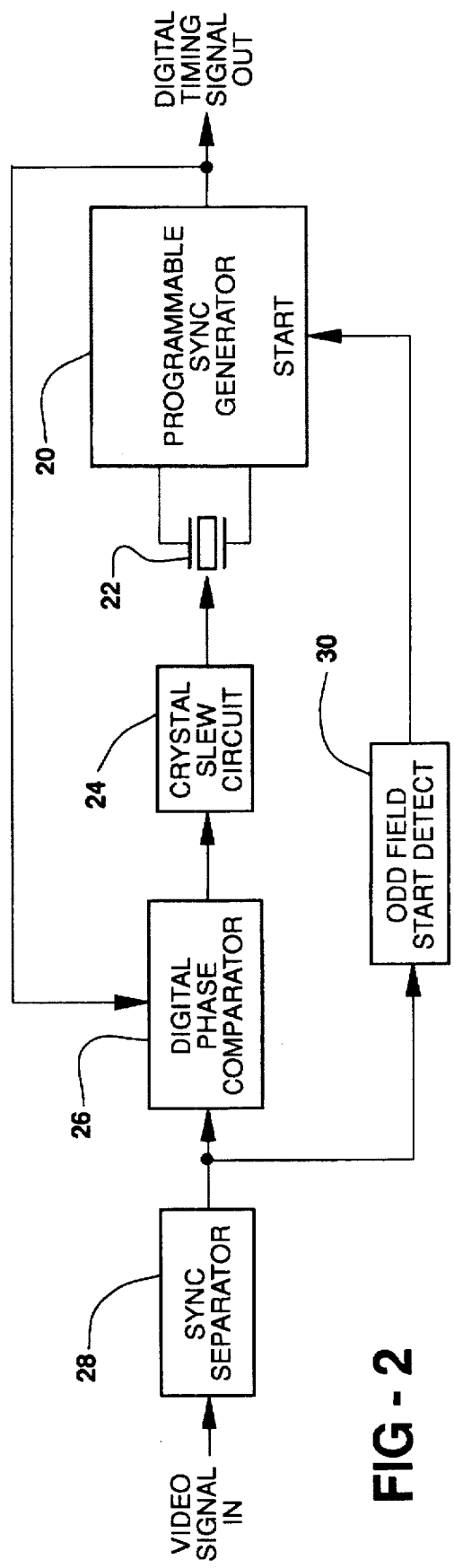

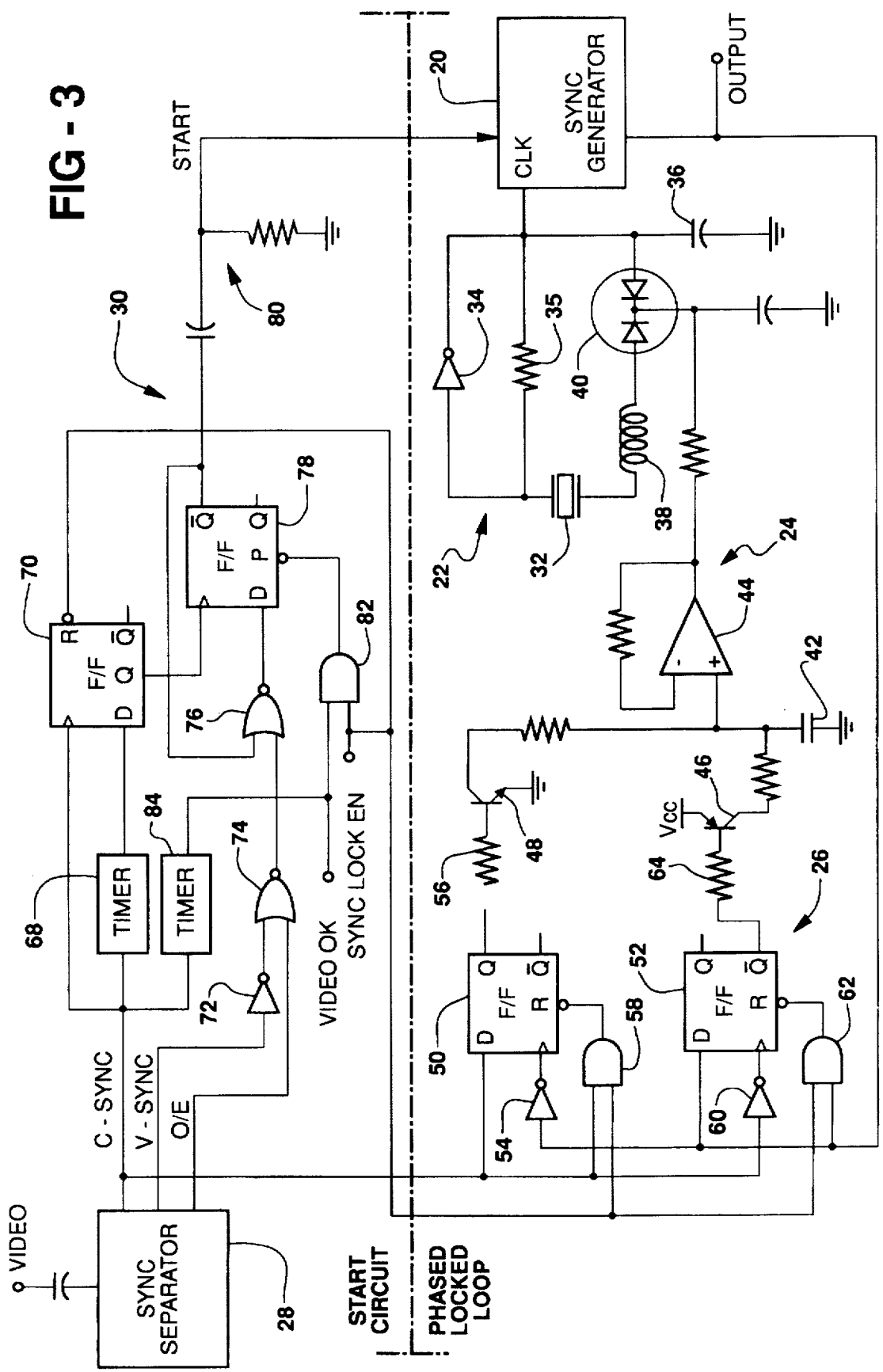

METHOD AND APPARATUS FOR SYNCHRONIZING INTERNAL AND EXTERNAL VIDEO SIGNALS

FIELD OF THE INVENTION

This invention relates to video signal control and particularly to operating an internally generated video signal in synchronism with an external video signal.

BACKGROUND OF THE INVENTION

Where it is desired to superimpose an image on a live video display it is necessary to synchronize the image video signal with the live video signal. This occurs, for example, in an automotive video graphics display which is used simultaneously with a video picture from a night vision camera or a rear view camera. The resulting display will be digital graphics such as an indication of vehicle speed over the scene from the camera.

A programmable sync generator allows a simple, cost effective way of creating windows in the display for overlaying graphics on live video. However to accomplish this the sync generator must be synchronized or "gen-locked" with the live video signal. Prior gen-lock techniques and devices either do not have the programmable nature required to generate graphics windows of varying size or involve costly video processors. Programmable sync generators are not designed for gen-lock capability. Thus an inexpensive way to gen-lock a programmable sync generator to an external video signal would make possible a low cost graphics display which is compatible with a signal from a video camera.

SUMMARY OF THE INVENTION

It is therefore an object of the invention to simply and inexpensively synchronize a programmable sync generator with an external video signal.

As applied to a motor vehicle, a video camera on the vehicle especially adapted for night vision or a conventional camera mounted for rear vision is coupled to a video display to present a live video scene for viewing by a vehicle operator. In addition, a video graphics controller generates graphics representing some vehicle condition such as speed based on data supplied by vehicle systems. The graphics are output in a video format and coupled to the video display where they are superimposed on the live video scene. To controllably position the graphics on the display the video graphics controller must be synchronized with the live video signal.

A programmable sync generator for the graphics is clocked by a crystal oscillator. Two circuits are used to accomplish the required synchronization with the external video signal. A start circuit includes a sync separator which digitizes the video signal to obtain a composite sync signal including a horizontal sync signal, and other signals, and logic which monitors the signals to detect the beginning of a frame. The start circuit issues just one pulse indicating the beginning of a frame. The sync generator responds to the pulse by starting to issue sync signals for the beginning of a frame which initially will be in synchronization with the video signal. A phase locked loop is then employed to maintain synchronization.

The phase locked loop includes a varactor and an inductor in series with the crystal oscillator to form a voltage controlled oscillator. By varying the varactor control voltage the crystal oscillation can be pulled from its nominal frequency sufficiently to follow variations in the video signal. A phase comparator responds to the sync generator output and the sync signal from the external video to charge or discharge a capacitor according to which signal is leading, and the voltage developed on the capacitor is amplified and used as the varactor control voltage.

BRIEF DESCRIPTION OF THE DRAWINGS

The above and other advantages of the invention will become more apparent from the following description taken in conjunction with the accompanying drawings wherein like references refer to like parts and wherein:

FIG. 1 is a block diagram of an automotive display system having inputs from a video camera and vehicle systems;

FIG. 2 is a block diagram of a synchronizing circuit for the system of FIG. 1 according to the invention;

FIG. 3 is a schematic diagram of the synchronizing circuit according to the invention.

DESCRIPTION OF THE INVENTION

Figure 4:
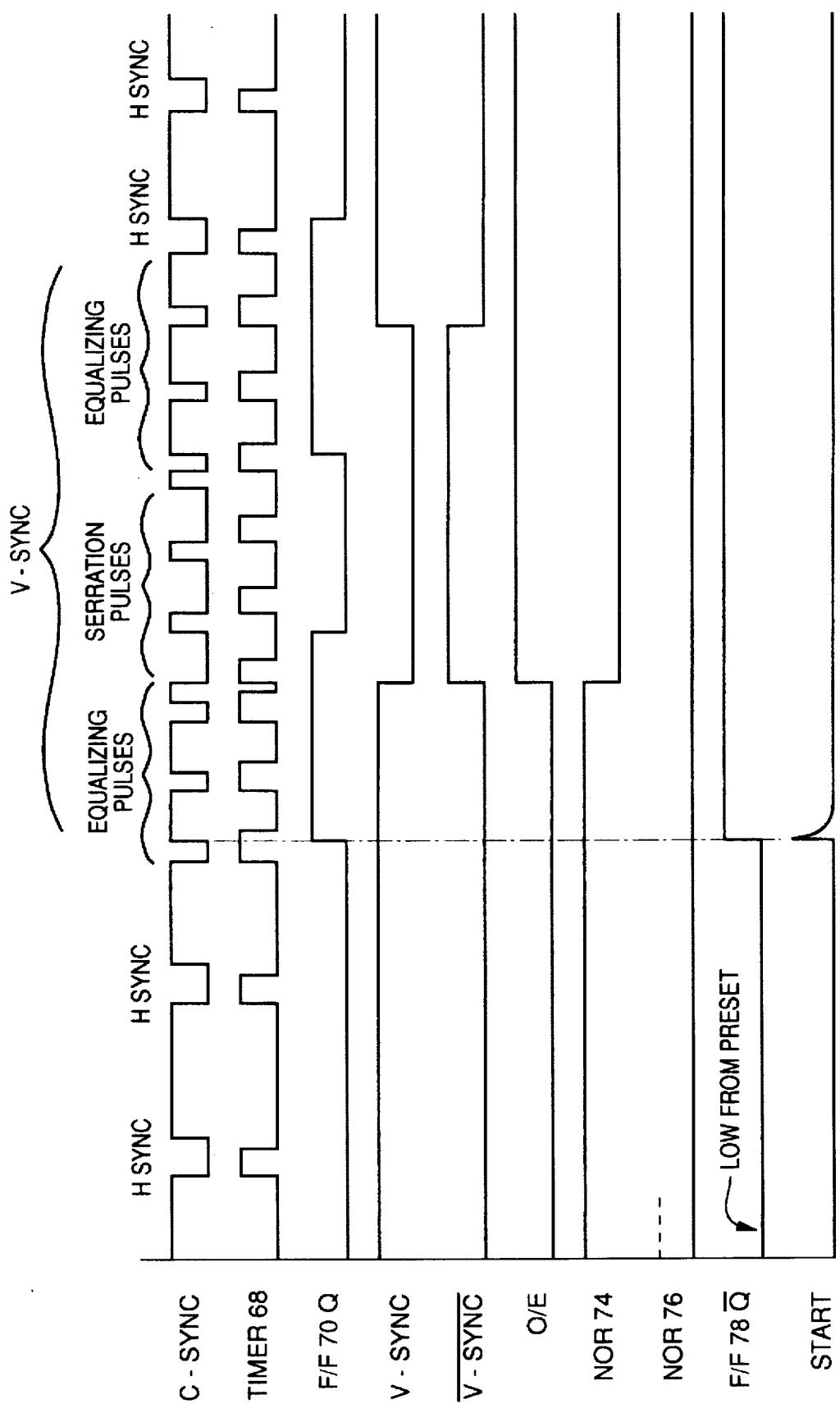
FIG. 4 is a set of waveforms illustrating the operation of the circuit of FIG. 3.

The ensuing description is directed to an automotive application of a video display having a live camera input and a video graphics controller synchronized with the camera input for overlaying graphics on display. The invention is not limited to the automotive application and is useful wherever a programmable sync generator is to be synchronized with or locked to an external video signal.

FIG. 1 shows a video camera 10 on board a motor vehicle which may be used for night vision or rear vision, for example, providing an "external" video signal coupled to a CRT or other video display 12. To display vehicle information such as speed in a window of the display 12, a video graphics controller 14 receives data from various vehicle systems 16, composes a signal containing the graphics, and applies that signal to the display 12. Additional signals from the programmable sync generator are used to alternately switch the video display between the live video signal and the graphics video signal resulting in the graphics window. To accurately locate the graphics window in the display, the controller 14 is coupled to the video signal from the camera and has a synchronizing circuit to lock the graphics signal with the external video signal.

The synchronizing circuit is shown in FIG. 2 in block form. It includes a programmable sync generator 20 which is clocked by a crystal oscillator 22. The sync generator 20 is a LM1882R chip available from National Semiconductor which outputs an internal timing signal. The clock signal for this chip must be 14.31818 MHz to ensure the generated signals meet the timing requirements of NTSC RS-170 specification. Since the starting edge of a graphics window is dependent on the horizontal gating signal from the sync generator, the clock must be stable or the edge of the window will jitter and the entire graphics window may appear blurred. A crystal oscillator circuit was chosen because of its frequency stability, however any variable oscillator circuit with high stability could be used in this device.

To lock the generated internal signal with an external signal, the crystal oscillator must be slightly variable so that a phase locked loop can be employed to ensure locking of the signals. The phase locked loop includes the generator 20, crystal oscillator 22, a crystal slew circuit 24 coupled to the crystal 22, and a digital phase comparator 26 which responds to a digitized video signal and the sync generator 20 output signal.

A sync separator 28 comprises, for example, a LM1881 chip available from National Semiconductor which receives the external video signal and digitizes the signal to yield a digital composite sync signal. This composite signal contains the horizontal sync pulses which are input to the digital phase comparator 26. An odd field start detect circuit 30 receives the composite signal and monitors the signal to detect the start of an odd field and output a start signal to the programmable sync generator 20. The generator chip uses the start of an odd field as the start of a frame. Thus the odd field start detect serves to detect the start of a frame. Only one start signal is generated, at the beginning of operation.

In operation, when the programmable sync generator 20 receives the start signal it produces the internal timing signal initially synchronized with the external video signal. Then the phase locked loop takes over to thereafter lock the internal and external video signals.

Referring to FIG. 3, the crystal oscillator 22 comprises a modified Pierce-IC oscillator circuit including an inverter 34 in series with the crystal 32 and a load resistor 35 across the inverter and a capacitive load 36 to ground. To use the crystal oscillator as a voltage controlled oscillator, tuning capability is afforded by an inductor 38 and a varactor 40 in series with the crystal to pull the crystal frequency. The inductor cancels out the crystal's internal capacitance $C_O$ thereby lowering the oscillating point by about 15 KHz. Increasing the value of the inductor would pull the crystal low until the inductance begins to form a tuned tank with the crystal's internal capacitance and stability would be lost. To prevent this the inductor value is limited to about 15 µH.

The variable capacitance $C_V$ of the varactor 40 affects the serial capacitance $C_S$ of the crystal. As the serial capacitance $C_S$ is reduced the oscillating frequency increases. Thus as $C_V$ is reduced, $C_S$ is reduced and the oscillating frequency is raised. A very small value of $C_V$, about 3 or 4 pF, pulls the crystal frequency up by about 25 KHz. As $C_V$ is increased, it has less effect on $C_S$ and the frequency is pulled less. Thus by varying the varactor capacitance from 4 to 40 pF in combination with a 12 µH inductor, the crystal oscillating point varies from −10 KHz to +10 KHz around its specified value. This variation is sufficient to achieve gen-locking.

Control of the varactor is accomplished by varying the voltage on its reference pin. The varactor is just two back-to-back tuning diodes which have the property of decreasing capacitance as the reverse voltage is increased. Thus as the voltage applied to the cathodes of the diodes is increased, the capacitance drops. The control voltage is generated by charging or discharging a capacitor 42 which is coupled to the varactor by a voltage doubling amplifier 44. The capacitor 42 is charged by a transistor 46 and discharged by a transistor 48 which are connected to $V_{CC}$ and ground, respectively. The transistors, in turn, are controlled by the phase comparator 26 such that capacitor charging occurs when the internal signal is lagging the external signal and discharging occurs when the internal signal is leading. Thus the control voltage and the frequency vary according the to phase difference of the internal and external video signals.

The phase detector 26 comprises two D-type flip-flops 50 and 52 which respectively detect a leading condition and a lagging condition. The composite signal C-sync is coupled to the data input of F/F 50 and the sync generator output is coupled through an inverter 54 to the clock terminal. The Q output is connected through a resistor 56 to the base of the transistor 48. An AND gate 58 has its inputs coupled to C-sync and sync lock enable ( which originate from a microprocessor in the video graphics controller). The gate output is connected to an inverted reset terminal of the F/F 50. When the sync lock is enabled and a C-sync pulse is not present, the AND gate output is high and ineffective to cause a reset. If the internal signal is leading, the falling edge of the internal signal clocks the F/F 50 and the value of the external sync will still be 1 and that value is transferred to the Q output, causing the transistor 48 to conduct to discharge the capacitor and decrease the frequency. When the external sync pulse goes low the AND gate output will fall to reset the F/F 50, turning off the transistor 48. Thus the transistor will conduct in the period between the two falling edges of the internal and external video signals. This allows a greater degree of capacitor discharge for a greater amount of leading. When the internal signal is lagging, the falling edge of the external signal will occur before the internal signal clocks the F/F 50 and the Q output will remain in its reset condition (low).

The lagging detector comprising F/F 52 is complementary to the leading detector. The data input is connected to the internal signal and the clock input is connected via an inverter 60 to the external signal or C-sync. An AND gate 62 has inputs connected to sync lock enable and the internal signal. The /Q output is coupled through a resistor 64 to the base of the transistor 46. If the internal signal is lagging, the external signal will clock in a high value so that /Q will go low to turn on transistor 46 to charge the capacitor. Then when the internal signal goes low, AND gate 62 goes low and F/F 52 resets to turn off the transistor 46.

The sync separator 28 is capacitively coupled to the external video signal; it digitizes the external sync signal and outputs the composite signal C-sync, the vertical signal V-sync, and the odd/even field indication (even is 0, odd is 1). The composite signal includes H-sync pulses which are 4.5 to 5 µs wide, and during the retrace interval the equalization pulses are only 2.5 µs wide.

The role of the start pulse circuitry 30 is to detect the beginning of an odd field in the external video signal and send one pulse to the sync generator 20. After it is started, no further start pulses are sent. The circuit detects the beginning of a new field by monitoring the width of the H-sync pulses. A pulse is generated when the first narrow equalization pulse is detected, the odd/even field output is low, and the V-sync signal is high.

A one-shot timer 68 set to output a pulse 3.5 µs wide has its output connected to the data input of a D-type F/F 70. The C-sync signal is coupled to the timer input and to the F/F clock input. The falling edge of the external video H-sync pulses triggers the timer 68. At the F/F 70, the rising edge of the H-sync clocks in the timer value. During a normal H-sync pulse, this clocking event occurs 5 µs after the timer has started. By this time the timer pulse has timed out and the value clocked into the F/F will be a 0. When an equalization pulse occurs, the clocking edge occurs 2.5 µs after the timer has been started and the timer has not yet timed out. Hence a value of 1 is clocked to the Q output of the F/F at each equalization pulse. During one entire frame, this circuit will then give four pulses, one at the beginning and one at the end of V-sync in the even field, and the same in the odd field. Thus the F/F 70 will output one pulse preceding and one pulse following the vertical retrace period for each field.

V-sync is coupled through an inverter 72 to one input of a NOR gate 74 and the odd/even field is connected to the other NOR gate input. The NOR gate output is connected to an input of another NOR gate 76. A D-type F/F 78 has a data input connected to the output of NOR gate 76 and a clock input connected to the Q output of F/F 70. The output /Q of F/F 78 produces the start pulse and is coupled through a high pass filter 80 to the sync generator 20. The output /Q is also connected back to an input of the NOR gate 76. An AND gate 82 has its output connected to the preset terminal of F/F 78. A second timer 84 is set to yield an output pulse which is long enough to be continuous as long as the C-sync is present to provide a "video OK" signal, and the output goes low when the external video is removed. The video OK signal and the sync lock enable signal are input to the AND gate 82 to cause preset of F/F 78 (/Q is low) when either signal goes low. The sync lock enable signal is also coupled to the reset terminal of F/F 70 to cause reset when the signal goes low.

The waveforms of FIG. 4 show the C-sync pulses which are low-going pulses on a normally high signal, and comprise the last few H-sync pulses of an even field followed by a few short equalization pulses at the beginning of an odd field, a few serration pulses, more equalizing pulses and then the first H-sync pulses of the odd field. This is an approximation of the C-sync pulses since the actual signal has a greater number of equalization and serration pulses. The output /Q of F/F 78 is initially low due to a preset. The falling edges of C-sync pulses start the timer 68 which produces short reference pulses. The rising edge of C-sync pulses clock the F/F 70. The first equalization pulse is effective to clock a high timer signal to the Q output of the F/F 70. (This occurs again at the first pulse of the second set of equalization pulses, but the other conditions for a start pulse are not met.) At the time the F/F 70 Q output first goes high, the V-sync is high, its inverted value is low and the odd/even value is low, thus causing the NOR gate 74 output to be high. This forces the NOR gate 76 to be low so that when the Q output of F/F 70 goes high it clocks the low data input of the F/F 78 causing the /Q output to go high; the /Q output remains high due to the latching action of NOR gate 76 to hold the data input low. This condition prevails until the F/F 78 is preset by interruption of the video OK or the sync lock enable signal. When the F/F 78 goes high a single start pulse passes the filter 80 to start the synchronous generator 20. Similar action does not occur at the beginning of the even field because the odd/even value is high, holding the NOR gate 74 low.

When the start signal triggers the sync generator 20, the internal timing signal begins and is initially synchronous with the external signal. If the external video signal should vary from the timing of the sync generator, the phase locked loop will pull the frequency of the oscillator 22 in a direction to bring the sync generator into synchronism with the external signal. In the absence of an external signal or a sync lock enable, the start circuit does not function and the sync generator will run at its own rate. If then the signals are applied to turn on the AND gate 82, a start signal will be produced at the beginning of the next frame.

It will thus be seen that a relatively simple and inexpensive circuit is provided to manage the locking of the programmable synchronous generator with the external video signal.

The embodiments of the invention in which an exclusive property or privilege is claimed are defined as follows:

1. A method of synchronizing a programmable sync generator output with an external video signal where the sync generator frequency is controlled by a voltage controlled oscillator comprising the steps of:

detecting the beginning of a frame in the video signal by digitizing the video signal, monitoring the digitized signal for determining the beginning of a frame, producing a start pulse for starting the sync generator at the beginning of a frame, and after one start pulse is produced, inhibiting any additional start pulses so long as the video signal is present;

starting the sync generator when the frame begins so that initially the sync generator output signal is synchronized with the video signal;

comparing the phases of the output signal and the video signal and generating a voltage according to phase differential; and adjusting the voltage controlled oscillator with the generated voltage to null the phase differential, whereby the output signal is synchronized with the external video signal.

2. A method of synchronizing a programmable sync generator output with an external video signal wherein the beginning of a frame is indicated by the beginning of an odd field and where the sync generator frequency is controlled by a voltage controlled oscillator comprising the steps of:

detecting the beginning of a frame in the video signal by digitizing the video signal, and monitoring the digitized signals for determining the beginning of an odd field;

starting the sync generator when the frame begins so that initially the sync generator output signal is synchronized with the video signal;

comparing the phases of the output signal and the video signal and generating a voltage according to phase differential; and adjusting the voltage controlled oscillator with the generated voltage to null the phase differential, whereby the output signal is synchronized with the external video signal.

3. A method of synchronizing a programmable sync generator output with an external video signal where the sync generator frequency is controlled by a voltage controlled oscillator comprising the steps of:

detecting the beginning of a frame in the video signal by digitizing the video signal to obtain composite and vertical sync signals and an odd/even field signal, and monitoring the pulse width of the composite sync signal and the states of the vertical sync signal and the field signal for the start of a frame;

starting the sync generator when the frame begins so that initially the sync generator output signal is synchronized with the video signal;

comparing the phases of the output signal and the video signal and generating a voltage according to phase differential; and adjusting the voltage controlled oscillator with the generated voltage to null the phase differential, whereby the output signal is synchronized with the external video signal.

4. The invention as defined in claim 3 wherein the composite sync signal comprises standard width pulses during a field scan and short pulses at the beginning of each field, and wherein the step of monitoring the pulse width comprises:

generating reference pulses having a pulse width between the widths of the standard and short width pulses; and comparing each pulse of the composite sync signal to a reference pulse to detect the short pulses.

5. The invention as defined in claim 4 wherein the states of the vertical sync signal and the odd/even field signal determine which of the detected short pulses correspond to the beginning of the frame.

6. Apparatus for synchronizing a programmable sync generator with an external video signal comprising:
   a start circuit coupled to the video signal for furnishing a start pulse to the sync generator at the beginning of a frame to initially synchronize the sync generator output signal with the video signal, the start circuit comprising
   a sync separator for digitizing the video signal to obtain a composite sync signal, and
   a circuit for monitoring the width of the composite sync signal pulses to detect the start of a frame;
   a phase locked loop for maintaining synchronism including the sync generator, a voltage controlled oscillator coupled to the sync generator clock input, and a phase comparator; and
   the phase comparator being responsive to the video signal and the generator output and includes means for producing a voltage for controlling the oscillator frequency.

7. Apparatus for synchronizing a programmable sync generator with an external video signal comprising:
   a start circuit coupled to the video signal for furnishing a start pulse to the sync generator at the beginning of a frame to initially synchronize the sync generator output signal with the video signal, the start circuit comprising
   a sync separator for digitizing the video signal to obtain composite and vertical sync signals and an odd/even field signal, and
   a circuit for monitoring the width of the composite sync signal pulses and the states of the vertical sync signal and the field signal for the start of a frame;
   a phase locked loop for maintaining synchronism including the sync generator, a voltage controlled oscillator coupled to the sync generator clock input, and a phase comparator; and
   the phase comparator being responsive to the video signal and the generator output and includes means for producing a voltage for controlling the oscillator frequency.

8. Apparatus for synchronizing a programmable sync generator with an external video signal comprising:
   a start circuit coupled to the video signal for furnishing a start pulse to the sync generator at the beginning of a frame to initially synchronize the sync generator output signal with the video signal, the start circuit comprising
   a sync separator for digitizing the video signal to obtain composite and vertical sync signals and an odd/even field signal; and
   a circuit for detecting the start of a frame including
      a timer for generating a reference pulse width for each composite sync pulse,
      a circuit for comparing each composite sync pulse to a reference pulse to detect short pulses, the short pulses occurring at the beginning of each field, and a circuit for validating a short pulse as the start of a frame
      when it is coincident with vertical sync and field signals consistent with the start of a frame;
   a phase locked loop for maintaining synchronism including the sync generator, a voltage controlled oscillator coupled to the sync generator clock input, and a phase comparator; and
   the phase comparator being responsive to the video signal and the generator output and includes means for producing a voltage for controlling the oscillator frequency.

9. The invention as defined in claim 8 wherein the start of the frame is defined as the beginning of an odd field, and the validating circuit comprises:
   a logic circuit having the vertical sync and the odd/even field signals as inputs and producing an enabling output when the vertical sync is high and the field signal is low.

* * * * *